Patented Sept. 25, 1928.

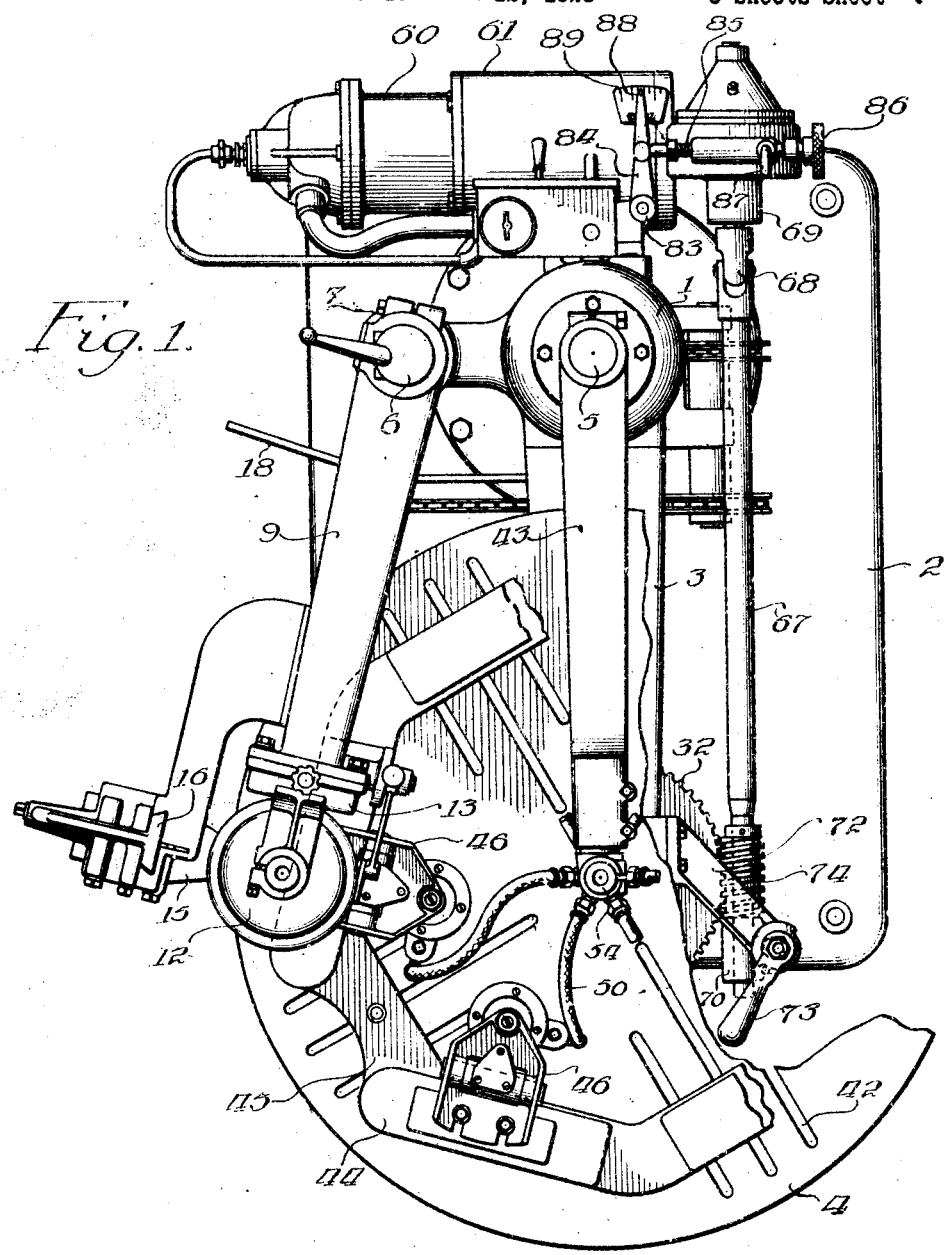

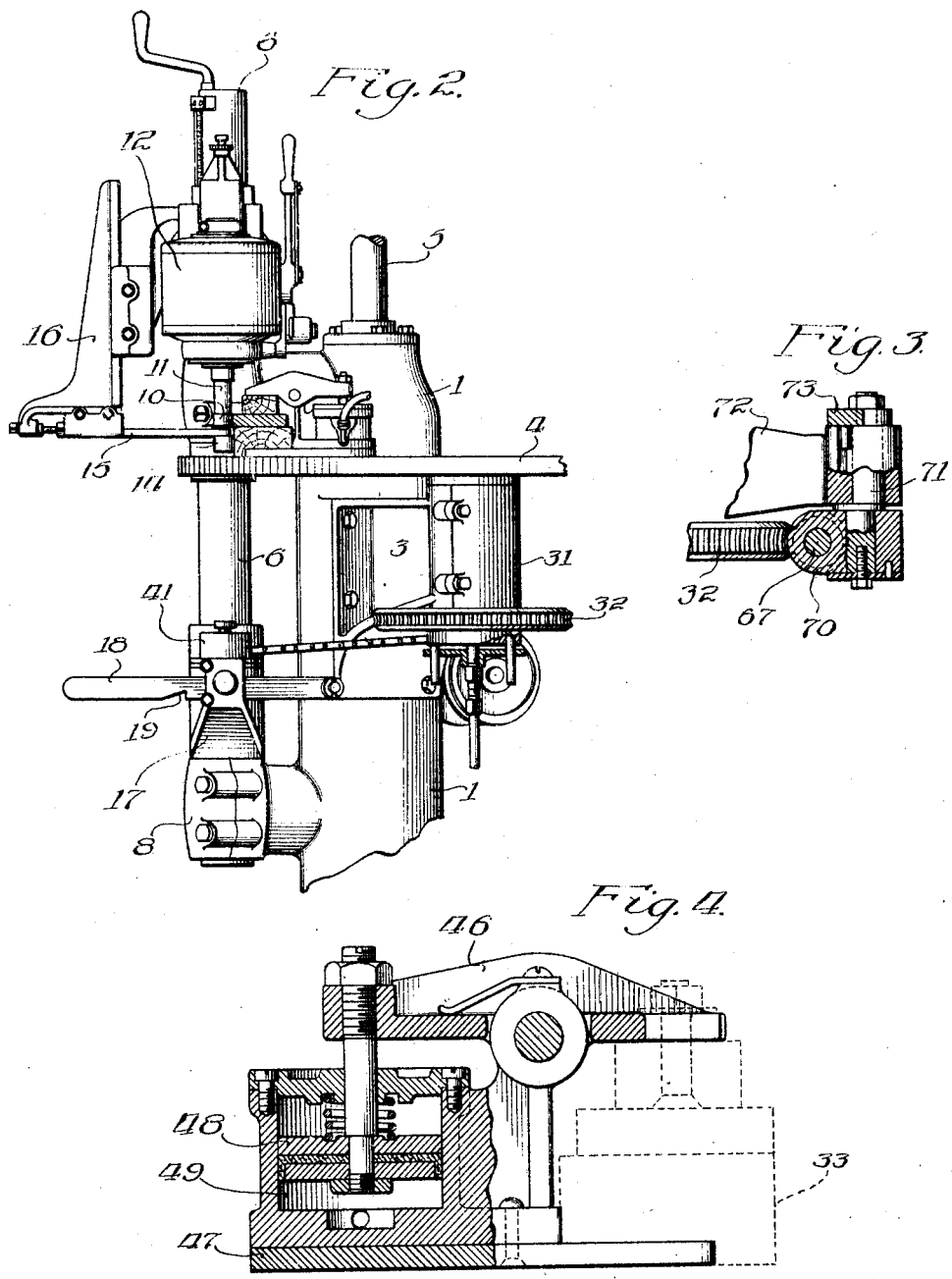

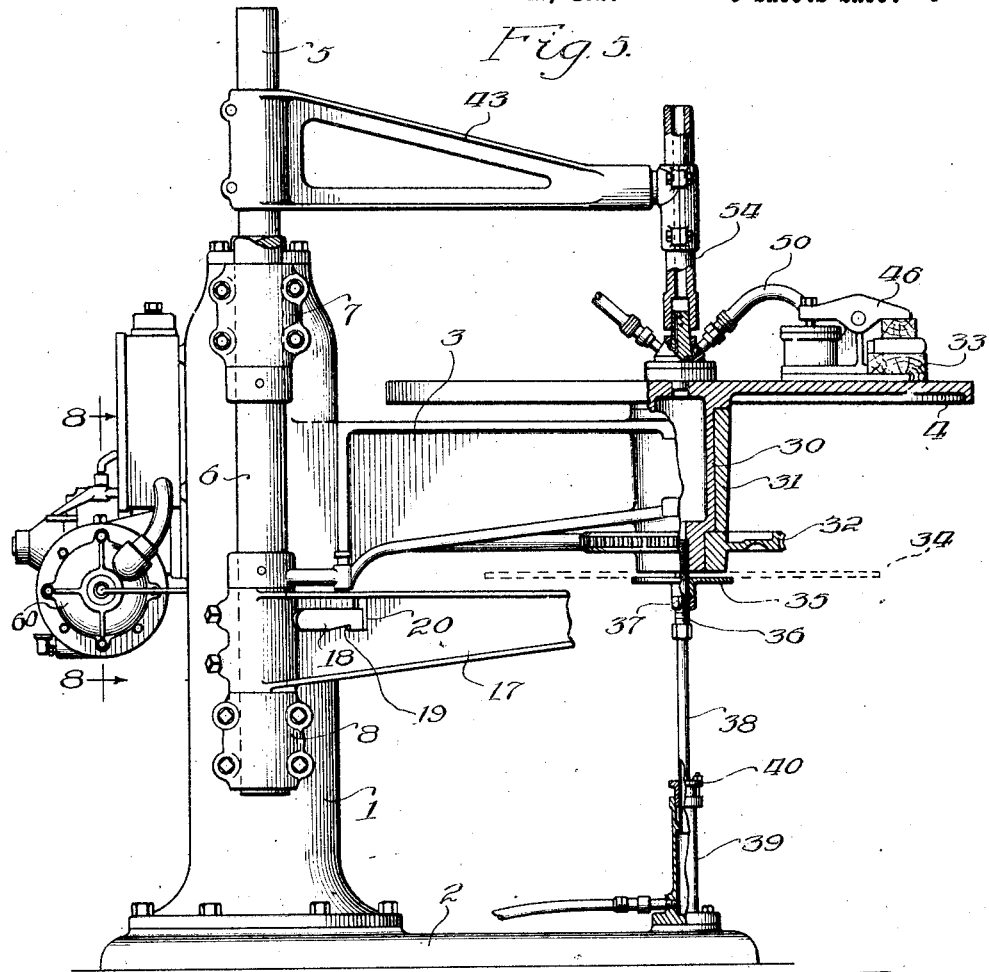
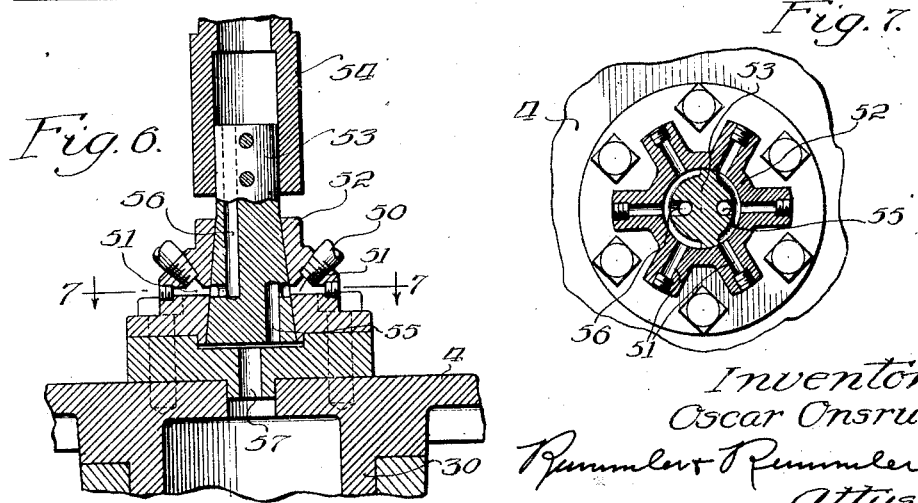

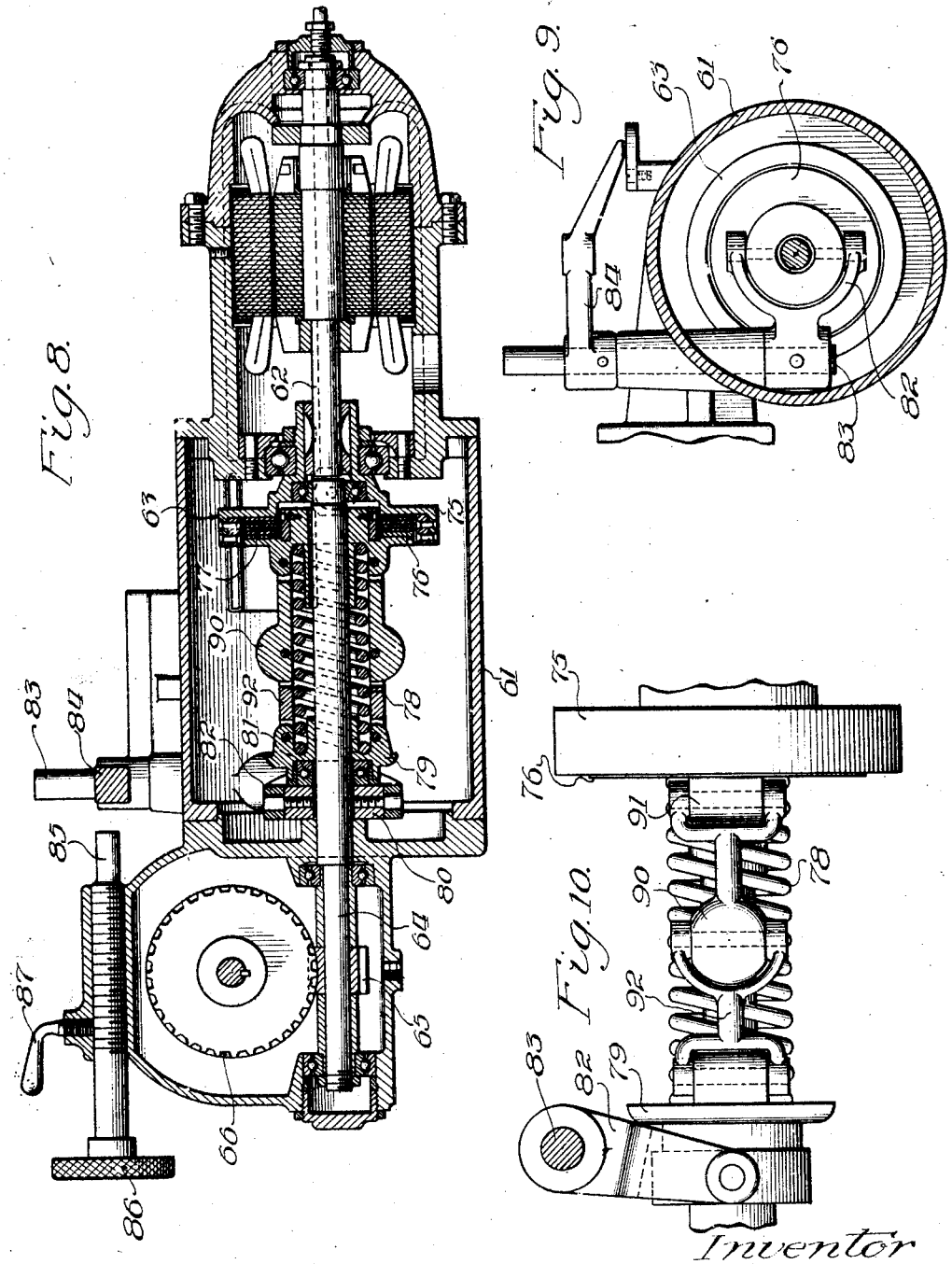

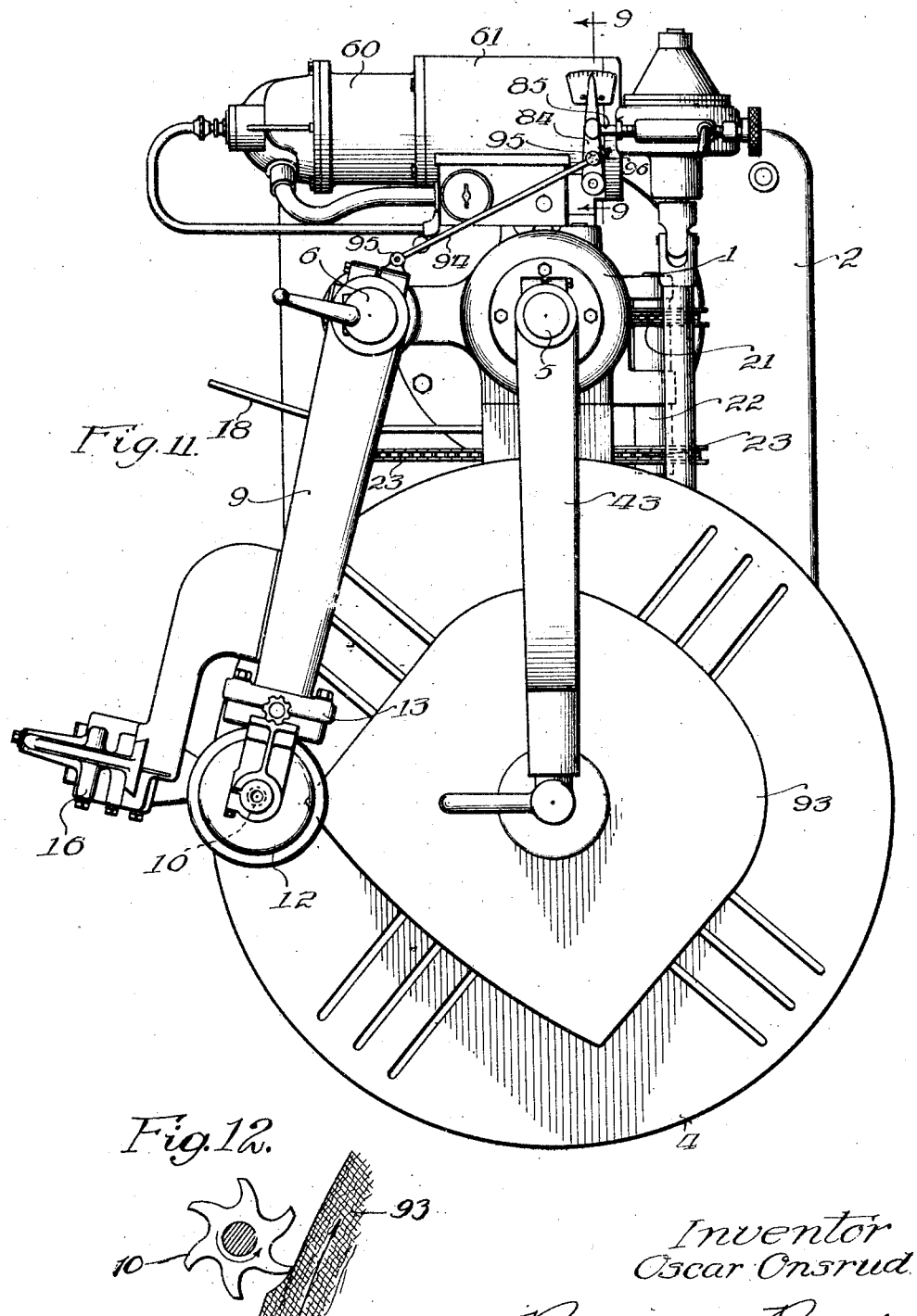

1,685,613

UNITED STATES PATENT OFFICE.

OSCAR ONSRUD, OF CHICAGO, ILLINOIS, ASSIGNOR TO ONSRUD MACHINE WORKS, OF CHICAGO, ILLINOIS, A CORPORATION OF ILLINOIS.

WOODWORKING MACHINE.

Application filed November 12, 1926. Serial No. 147,917.

This invention relates to improvements in wood working machines and the like, and more particularly to improvements in the work support drive thereof.

In wood working machines, such as shapers, for work of irregular contour, such as forming chair seats, routing out the groove for the cane spline, shaping the inside of the seat, shaping mirror frames, or chair arms and such pieces arranged in a substantially circular or rectangular formation, the work is clamped to a revolving work table and turned in a cooperative relation with a swingingly mounted high-speed cutter implement, which is guided by a suitable model into contact with the work, to swing in and out as the work is rotated to follow the irregular outlines. In such machines, the cutter, which is of small diameter, is driven at a very high speed, around 7200 R. P. M. Since the speed of the cutter is substantially fixed, considerable latitude is necessary in the speed regulation of the work table drive, since that is the only variable factor available, in order to accommodate the machine for widely differing classes of work. For different grades of wood, different cutting speeds are found to be more suitable than others, and the work varies in size and shape. Parts of the outline of one style of work may be on a short radius from the rotational axis of the work table, and other portions of the same work may be at greater distances from the axis.

It would obviously be impractical to supply a gear transmission with the desirable number of selected speeds, since the size would be prohibitive. Also the constant torque, positive transmission would not drive the table steadily, since the resistance to turning varies. In some set-ups the cuts are even intermittent, and a constant torque drive would cause the table to speed up while the cutter was out of engagement and slow down while the cutter was engaged.

The main objects of this invention are to provide a machine which is adaptable for a wide range of work; to provide a machine in which the cutting speed is held substantially constant; to provide for such a machine a variable torque drive for different predetermined speeds; to provide automatic means for regulating the speed of the table in proportion to the distance of the cutter from the axis of rotation of the table; and to provide an automatically operating work clamp of suitable arrangement whereby loose pieces may be inserted and removed at one side of the table, and held rigidly while in relation with the cutter.

Further objects and advantages will appear in the following description with reference to the illustrative embodiment of the invention shown in the accompanying drawings in which:

Figure 1 is a plan view of the wood shaper, with parts broken away.

Fig. 2 is a fragmental front elevation of the shaper.

Fig. 3 is a detail of the work table drive throw-out mechanism.

Fig. 4 is a sectional detail of one of the pneumatic clamps.

Fig. 5 is a side elevation of the shaper with parts shown in section.

Fig. 6 is an enlarged sectional detail of the automatic control valve for the air clamps, shown in Fig. 5.

Fig. 7 is taken on the line 7—7 of Fig. 6.

Fig. 8 is an enlarged sectional view of the transmission substantially taken on the line 8—8 of Fig. 5.

Fig. 9 is a section taken on the line 9—9 of Fig. 11.

Fig. 10 is a plan view of the clutch parts shown in Fig. 8.

Fig. 11 is a plan view of the shaper showing the automatic speed control.

Fig. 12 is a diagram of the relation of the cutter to the work.

Referring to the drawings, the pedestal 1 is mounted on the base 2, and is provided with a laterally extending arm 3 in which is rotatably mounted the work support table 4. The over arm support shaft 5 is mounted in the center of the pedestal 1, and the vertical cutter arm post 6 is adjustably mounted in the bearing brackets 7 and 8 in the side of the pedestal 1. The cutter support arm 9 is secured to the post 6 to swing over the work table.

The cutter 10 is mounted directly on the shaft 11 of the high-speed fluid-driven turbine 12, which is mounted for vertical adjustment in the slide 13, in the outer end of the arm 9. The cutters are, of course, mounted on a spindle which is removably secured in the hollow shaft of the motor, so that various types of cutter suitable for the work in hand may be quickly installed.

The model follower roller 14, or tracer, is mounted directly on the cutter spindle, in Fig. 2, where the model is clamped to the upper surface of the work table. A steady rest 15 is provided, which comprises a plate having a bearing against the cutter spindle and adjustably mounted in a slide 16 secured to the cutter arm 9. The cutters may be long, short, irregularly formed, profiled, or of very small diameter for routing narrow grooves according to the nature of the work.

A control arm or handle 17 is clamped to the shaft 6 parallel to the cutter arm and locked below the table. For holding the cutter out away from the table a latch 18 is provided which is pivoted to the pedestal 1 and is provided with a notch 19 for engaging the bottom of the slot 20 in the arm 17, through which the latch 18 extends. The shaft 6 is urged to swing the cutter inwardly by means not fully illustrated but including a weight hung in the interior of pedestal 1. Arm 17 fast to shaft 6 is pulled inwardly by means of a connection to this weight including a chain 23 (Fig. 11) which is fastened to arm 17 and to a pulley fast on the shaft 22. This shaft also carries a pulley which is connected to the weight in the pedestal by means of a chain 21.

The work table 4 is provided with a hollow post or axle 30, which extends rotatably through the bearing 31 in the lateral arm 3. The axle 30 is shouldered at the lower end to receive the worm gear 32, which is rigidly secured in position. The model may be clamped to the surface of the work table, as shown at 33 in Fig. 5, or may be clamped to the lower end of the axle 30, as shown by the dotted lines 34 in the same figure. The model in the lower position is clamped to suitable dowel pins by means of the plate 35, held by the threaded bolt 36 and the nut 37, the bolt 36 being screwed into the center of the axle 33.

When air clamps are used for holding the work on the table, air is conducted to the center of the axle 30 by means of the pipe 38 which is secured in the hollow bolt 36, and fitted into a short stand pipe 39, secured to the base 2, through suitable stuffing box 40. When the model is used below the table, the tracing roller 41, Fig. 2, is clamped to the control arm 17, in vertical alignment with the cutter 10.

Work may be held for interior cuts by means of T-bolt clamps secured in the slots 42 in the upper surface of the work table 4. Solid work, such as a saddle chair seat, may be held by a post in the end of the over arm 43, which is mounted on the post 5. Other types of work, such as loose pieces, may also be shaped by clamping each piece individually in the circular arrangement in relation with a model for suitably guiding the cutter. Such an arrangement is shown in Fig. 1 where a plurality of pieces 44 are each held in position on the model cam 45 by means of the air clamps 46.

Each clamp 46 is pivotally mounted in a suitable base 47 which is bolted to the top of the table 4. The rear end of the clamp 46 is provided with a piston 48 operating in an air cylinder 49 which is connected by means of the hose 50 to a corresponding passage 51 in the valve casing 52. The valve casing 52 is mounted in the center of the table and contains a circular tapered valve 53 which is held from rotating by means of a hollow rod 54, clamped in the end of the over arm 43. The valve head 53 is provided with a pressure port 55 and exhaust port 56. The port 55 communicates through a passage 57 into the interior of the axle 30, and thereby to the source of fluid pressure; and the port 56 communicates with the interior of the port 54, which is open at the top, as shown in Fig. 5. Said ports register successively with the passages 51 which are connected to the respective air clamp cylinders 49, so that the clamps are automatically released on the side of the table opposite to the cutter, and locked down when in relation with the cutter. By this arrangement the machine may be continuously operated, and the pieces inserted and removed at the one side.

The motor 60 is attached to the transmission housing 61, which is bolted to the rear of the pedestal 1 and the motor shaft 62, or drive shaft, is connected through a friction plate transmission 63 to the shaft 64. The shaft 64 is rotatably mounted in the housing 61 and is provided with a worm 65 which engages a worm wheel 66, which is keyed to the work drive shaft 67. The shaft 67 is provided with a universal joint 68, and the rear portion of the shaft is rotatably mounted in a housing 69, which is secured to the transmission housing 61. The forward end of the shaft 61 is provided with a bearing 70 which is mounted on an eccentric pin 71, which is rotatably secured in the end of the bracket 72, secured to the arm 3. A handle 73 is provided for the eccentric pin 71, so that the worm 74, keyed on the shaft 67, may be thrown into or out of engagement with the work table drive gear 32 for starting and stopping.

In order to regulate the speed of the work table, I provide a variable torque adjustable speed transmission in which the clutch spring of a friction plate clutch is opposed at a predetermined speed by the action of a conical pendulum governor. In this transmission the clutch drum 75 is keyed to the motor shaft 62, and the clutch follower plate 76 is splined to the driven shaft 64. One set of the clutch friction plates 77 are slidably keyed to the drum 75, and the other set is keyed to the hub of the follower 76. The follower 76 is urged toward the drum 75 by means of the clutch spring 78 to press the plates 77 into frictional drive engagement. The spring 78 seats at one end in the follower 76 and at the other end in the collar 79 which bears against the adjusting collar 80 through the ball thrust bearing 81. The collars 79 and 80 are slidable on the shaft 64 and are axially positioned by means of the pivoted fork 82 which engages the collar 80 and is mounted on the lower end of the control lever shaft 83, which is rotatably mounted in the transmission housing 61. At the upper end of the shaft 83 is secured the control lever 84. The lever 84 is moved for operating the clutch by means of the adjusting screw 85, which is mounted in a bearing in the worm gear housing 69, and is provided with a suitable handle 86 and a lock clamp 87. The outer end of the lever 84 is provided with a pointer 88 which moves over a scale 89, fixed on the housing 61, to indicate the relative degree of adjustment.

For controlling the speed, the weights 90 of the governor are pivotally attached to lugs 91 in the follower member 76; and said weights are linked to the collar 79, which corresponds to the usual governor sleeve, by means of the pivotal links 92. As the speed increases, the weights 90 fly outward and tend to pull the follower 76 away from the plates, against the action of the spring 78, since the axial positioned collar 79 is substantially fixed by the adjustment of the lever 84 and fork 82.

According to the well-known laws of the conical pendulum governor, or of the weighted conical pendulum governor which is herein shown, the weights have a definite position for any particular speed; that is, the weights become static at a definite cone angle. In this transmission the weights are set at a minimum cone angle to maintain a predetermined speed, by positioning the collar 79 inwardly from the position shown. At speeds less than the predetermined speed, the weights will of course tend to move inward to approach the cone angle of rotation corresponding to the less speed, and they therefore tend to increase the pressure on the plates which is applied by the spring 78 and increase the torque to drive the table faster against a given load. At the predetermined speed the weights become static, and the spring alone is effective on the plates. But at higher speeds the weights 90 tend to move outward and thereby oppose the pressure of the spring 78 and decrease the effective pressure on the plates 77 to reduce the torque. Therefore, the governor tends to increase the torque below the predetermined speed, and decreases the torque above the said speed. In actual practice it is found that a very steady drive may be maintained for the work table 4. from a few revolutions per minute up to the full speed at which the table is geared to the motor by means of the two sets of worm drives.

As will be seen in Fig. 11, the corners of the chair seat 93 are on a considerably greater radius from the axis of the table 4 than the mid-portions to the sides. If the table 4 were driven at a constant speed, the cutter 10 would be moved faster at the corners, or at a higher cutting speed; and the cutting speed would be slowed up on the shorter radii. In order to maintain a substantially constant cutting speed for such work or irregular contour, I provide a connection between the rear end of the cutter arm 9 and the control lever 84, which comprises a rod 94 pivotally connected to the boss 95 on the rear end of the lever 9. The opposite end of the rod 94 extends through a post 95, pivotally secured in the lever 84, and receives, on the end projecting therethrough, a threaded adjusting nut 96. The nut 96 is so adjusted that it is drawn against the post 95 to move the lever 84 away from the adjustable stop provided by the screw 85 at the closer positions of the cutter. This accordingly increases the speed of the transmission when the cutter moves closer to the center by moving the collar 79 inward to slightly increase the conical angle of the pendulum weights 90. This increases the torque of the drive to bring the table up to the higher speed. For outward movement, the action is reversed with the result that the speed at which the cutter moves in the work is made uniform.

A main advantage of this machine is that, by means of positively controlled mechanical feed, the wood may be fed with the cutter as shown in Fig. 12. This is directly opposite to the former methods of operating wood cutting machines, where it was impossible to feed the wood with the cutter teeth to move from the surface of the work inwardly, because the cutter revolves at a very high rate of speed, since the cutting speeds are from 150 to 180 feet per second, and were apt to splinter or damage the wood. By using a positively controlled feed, the cutter teeth can cut into the wood from the outer surface and damaging the softest wood is avoided.

While but one illustrative embodiment of this invention has been shown and described, may modifications may be had without departing from the spirit of the invention, as defined in the following claims.

I claim:

1. A wood shaping machine comprising a base, a horizontal work support table mounted on the base to rotate on a fixed axis, a rotary cutter mounted on the base and supported in cooperative relation with the table, and a constant speed variable torque transmission mounted on the base for transmitting driving power for rotating the table and positively maintaining a predetermined rate of speed at which the work is fed to the cutter.

2. In a wood shaping machine, a base, a work support table mounted on the base to rotate on a fixed vertical axis, an arm pivotally mounted on the base to swing parallel to the table, a high speed rotary cutter mounted on the arm, means for guiding the cutter against the work mounted on the table, and a constant speed variable torque transmission mounted on the base for transmitting power for rotating the table and positively maintaining a predetermined rate of feed.

3. In a wood working machine, a work support mounted to rotate on a fixed vertical axis, a model mounted on the support, a cutter mounted to swing over the work support, and guided by said model into relation with the work, driving means for rotating the support and means for controlling the torque of said driving means to maintain a predetermined rate of feed.

4. In a wood working machine, a work support mounted to rotate on a fixed axis, a cutter cooperative with said support, a friction drive for rotating said support, and means for positively limiting the torque of said drive at a predetermined speed.

5. In a wood working machine, a work support mounted to rotate on a fixed axis, a rotary cutter, means for guiding the cutter into relation with irregular shaped work mounted on the support, a frictional drive for rotating said support, and means for governing the torque of said drive at a predetermined speed to control the rate of feed.

6. In a wood working machine, a work support table mounted to rotate on a fixed axis, a cutter mounted to swing on an arc towards the axis of said table, a drive for rotating the table, and means for controlling the speed of said drive, said means connected to said cutter and governed by the movement of the cutter with respect to the axis of the work table.

7. In a wood working machine, a base, a work table mounted on the base to rotate on a fixed axis, a cutter arm pivotally mounted on the base to swing in a plane perpendicular to the axis of the table, a drive for rotating the table, a friction clutch, a spring pressing the clutch into engagement and means for controlling the tension of said spring, said means connected to said arm so as to control the pressure of the spring on the clutch according to the position of the arm.

8. In a wood working machine, a base, a work table mounted on the base to rotate on a fixed axis, a cutter arm pivotally mounted on the base to swing over the work table, a drive for the table mounted on the base, a speed regulator for said drive, a control arm for the speed regulator, said control arm pivotally mounted in the base, and a connection from the cutter arm to the control arm to control the speed of the table according to the position of the cutter arm.

9. In a wood working machine, a rotatable support mounted on a fixed axis for holding work of irregular contour, a cutter movable on an arc through the axis of rotation of the table, means for moving the cutter in and out to follow the contour of the work, and a variable torque and constant speed drive for said support.

10. In a wood-shaping machine, a base, a work table mounted on the base to rotate on a vertical axis, an arm pivotally mounted on the base to swing in parallel relation with the table, a cutting implement mounted on the arm, means for guiding the cutting implement to shape work mounted on the table, a constant speed variable torque transmission mounted on the base for transmitting power for rotating the table, means for controlling the speed of the transmission, said means being connected to said arm so that the speed is governed according to the position of the arm.

Signed at Chicago this 9th day of November, 1926.

OSCAR ONSRUD.